United States Patent

Clark

[15] 3,657,951
[45] Apr. 25, 1972

[54] TUBULAR PRODUCTS CUT-OFF AND METHOD

[72] Inventor: Harry S. Clark, Route 3, Delaware, Ohio 43015

[22] Filed: Aug. 15, 1969

[21] Appl. No.: 850,495

[52] U.S. Cl..................................................83/54, 83/199
[51] Int. Cl.......................................................B23d 21/04
[58] Field of Search....................83/196, 199, 54, 179, 180, 83/187, 185, 186

[56] References Cited

UNITED STATES PATENTS

| 3,494,233 | 2/1970 | Kojima | 83/199 |
| 1,216,426 | 2/1917 | Erickson | 83/199 |

Primary Examiner—James M. Meister
Attorney—Oberlin, Maky, Donnelly & Renner

[57] ABSTRACT

A tubular products cut-off and method which includes an automatic infeed and outfeed with a pair of non-rotating dies, one or both of which may be driven for slight offsetting movement by an eccentric, such dies cooperating with internal dies on a mandrel to sever tubing while at the same time imparting a superior finish to the severed ends.

45 Claims, 21 Drawing Figures

INVENTOR
HARRY S. CLARK

BY Oberlin, Maky, Donnelly & Renner
ATTORNEYS

INVENTOR
HARRY S. CLARK

BY
Oberlin, Maky, Donnelly & Renner
ATTORNEYS

ZERO OFFSET   ENGAGING   MAXIMUM OFFSET   DISENGAGING

INVENTOR
HARRY S. CLARK

BY
Oberlin, Maky, Donnelly & Renner
ATTORNEYS

TUBULAR PRODUCTS CUT-OFF AND METHOD

This invention relates generally as indicated to a tubular products cut-off and method and more particularly to an automatic tube severing machine which imparts an unusually high quality finish to the tube ends as a result of the severing action.

In the formation of tubular products wherein lengths of tubing or pipe are cut into relatively shorter lengths, the sheared faces of the tube often have burrs, dimples, or other surface irregularities which require a subsequent high cost finishing operation before the tube section is usable in an assembly or manufacturing process.

It is accordingly a principal object of the present invention to provide a tube cut-off which will impart a high quality finish to the ends of the tube avoiding requirement for a subsequent finishing operation.

Another important object is the provision of a tube or pipe cut-off which can readily be adjusted to sever effectively tubes or pipes of different wall thicknesses.

A further object is the provision of a tube cut-off and method utilizing a pair of closely associated juxtaposed annular dies not rotating but with at least one moving in a predetermined relationship to the other.

Yet another object is the provision of a tube shear utilizing an adjustable stop system to control the amount of offset between the dies.

Still another object is the provision of a tubular product cut-off and method having a completely automatic infeed and outfeed, the latter also supporting the mandrel.

Other objects and advantages of the present invention will become apparent as the following description proceeds.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principles of the invention may be employed.

MACHINE, GENERAL ARRANGEMENT

Referring first to FIGS. 1 through 4, it will be seen that the machine includes a stand 20, the top surface 21 of which supports the cut-off head assembly 22. An infeed assembly shown generally at 24 feeds tubular stock from the right in predetermined increments into the cut-off head assembly 22 to be severed into shorter lengths. The infeed assembly 24 may be supported on special brackets 25 from the top of the base or stand 20.

The severed lengths of tube are conveyed over a mandrel assembly 27 by outfeed assembly 28 mounted on frame 29 supported by outfeed stand 30. The frame 29 extends from the outfeed stand 30 to the top of the base or machine stand 20. The frame 29 may be adjustably positioned and secured to the stand 20 by the adjustment indicated at 31. The outfeed assembly 28 also serves to support the mandrel 27 and to this end at least three mandrel supports 32, 33, and 34 are provided on the outfeed frame 29. The outfeed assembly 28 includes two endless rubber belts 36 and 37, shown more clearly in FIG. 5, running on opposite sides of the mandrel 27. Such belts are mounted in elongated housings 38 and 39, respectively and are trained about drive sprockets 49 and 41. Such sprockets are driven from drive motor 42 through transmission 43 and flexible drive shafts 44 and 45 as seen more clearly in FIG. 4.

As seen in FIGS. 1–3 and 10, the infeed assembly 24 includes a reciprocating carriage 48 which is mounted on guide rods 49 and 50 extending from support 51 on the top of the cut-off head assembly 22 to support 52 supported by the brackets 25. The center of the carriage is provided with a short stroke pneumatic piston-cylinder assembly 53, the rod 54 of which is connected to relatively short links 55 and 56, the outer ends of which are pivotally connected to tube gripping chuck elements 57 and 58, the upper ends of which are pivoted at 59 and 60, respectively, to the carriage 48.

Figure 10:
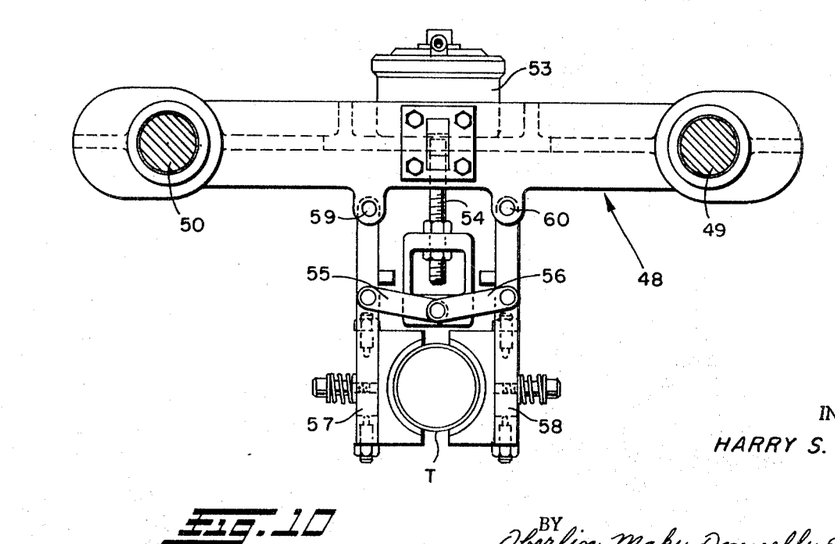
FIG. 10 is an enlarged vertical section through the infeed mechanism taken substantially on the line 10—10 of FIG. 1.

The carriage 48 is reciprocated by elongated piston-cylinder assembly 62, the rod 63 of which is connected at 64 to the carriage. The blind end of the piston-cylinder assembly is pivoted at 65 to transverse end frame 66.

The stroke of the carriage is limited by fixed stops and shock absorbers 68 and 69 opposed by adjustable similar shock absorbers 70 and 71, respectively, which serve to decelerate the carriage at the ends of the stroke. The shocks 70 and 71 are mounted on an adjustable frame 72 spanning the guides 49 and 50 and adjustment of the frame 72 and thus the shocks 70 and 71 is obtained by hand wheel 73. The hand wheel rotates screw 74 threaded into nut 75 held in bracket 76 extending upwardly from the frame 72. On the top of the bracket there is provided a slide 77 moving adjacent scale 78 enabling the operator precisely to set the length of the infeed stroke.

With the chuck piston-cylinder assembly 53 extended the tubular workpiece will be gripped and when retracted, the tubular workpiece will be released. The chuck will be engaged during the forward stroke and released during the return stroke. The tubular workpiece is fed in the selected increments into the cutting head assembly 22 through tubular workpiece infeed guide 80 to be positioned precisely with respect to the cutting dies.

Driving the cutting dies is a large drive motor 82 mounted on base 83 pivoted at 84 to the side of the stand or housing 20. The double ended motor 82 is provided with drive sheaves at each end, which through belt drives 85 and 86, drive clutch and brake assemblies 87 and 88, respectively. These clutch and brake assemblies drive the dies through the gearing seen more clearly in FIGS. 7 and 7A.

Figures 6, 8:
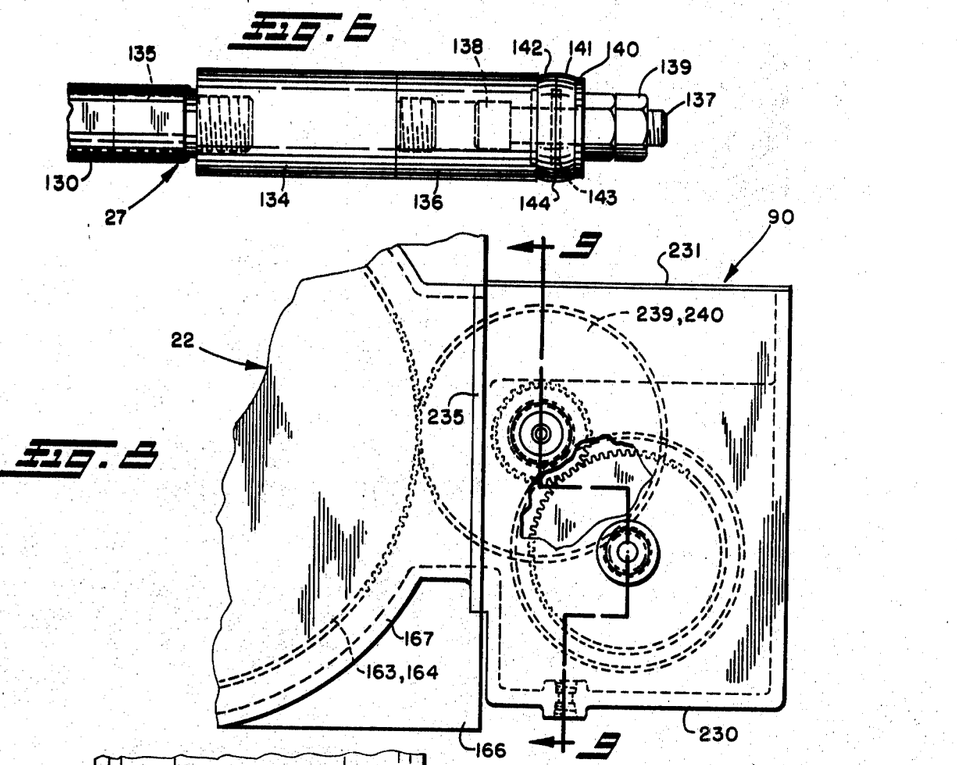
FIG. 6 is a fragmentary enlarged elevation of a mandrel which may be used with the present invention.
FIG. 8 is a fragmentary end elevation partially broken away of the timing gear housing.
Figure 9:
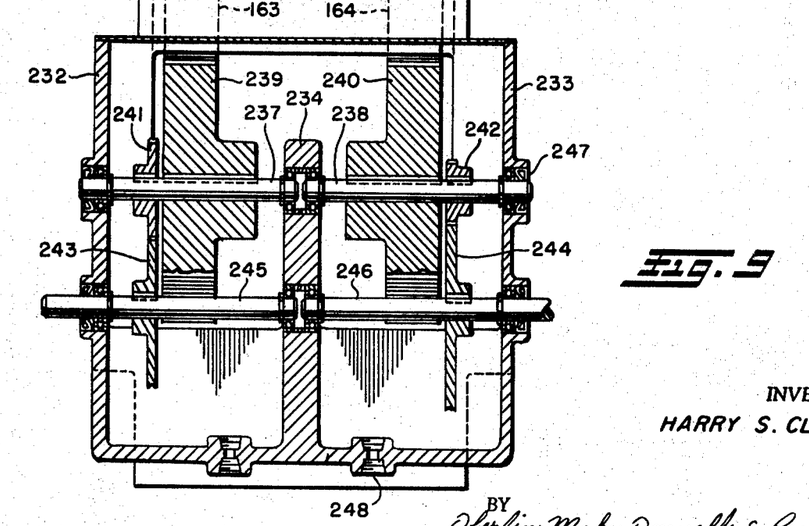
FIG. 9 is a vertical section through such housing taken substantially on the line 9—9 of FIG. 8.

Mounted on the side of the cutting head assembly 22 is a timing gear box 90 seen in more detail in FIGS. 8 and 9 driving rotary timing switches 91 and 92 controlling the sequence of operation of the machine.

MANDREL SUPPORT AND OUTFEED CONVEYOR ADJUSTMENT

Figure 5:
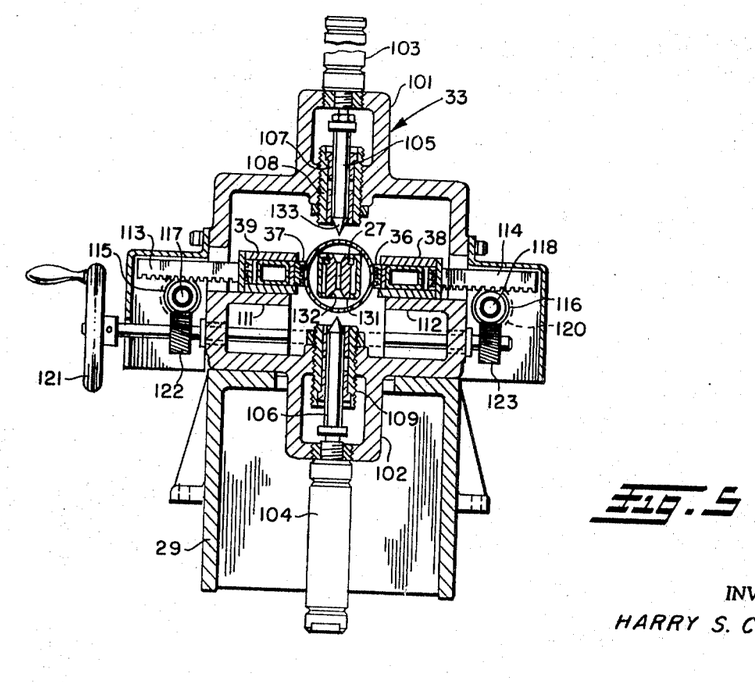
FIG. 5 is an enlarged fragmentary vertical section through the outfeed mechanism taken substantially on the line 5—5 of FIG. 1.

Referring now to FIG. 5, there is illustrated a mandrel support in greater detail. Each mandrel support is provided with a casting or frame 100 which includes vertically opposite extensions 101 and 102. Such extensions have secured thereto the rod ends of relatively small pneumatic piston-cylinder assemblies 103 and 104. The rods of such piston-cylinder assemblies are connected to mandrel support pins 105 and 106 guided by bushings seen at 107 in threaded sleeves 108 and 109. Such threaded sleeves are secured to the casting housing 101 and the mandrel support pins 105 and 106 are accordingly slide-guided for movement toward and away from the mandrel 27.

Such housings 101 are provided with inwardly directed shelves seen at 111 and 112 which support the conveyor housings 39 and 38, respectively. Secured to the back of such housings are racks indicated at 113 and 114 in mesh with pinions 115 and 116 on line shafts 117 and 118 which run parallel to the mandrel 27. Such shafts are journalled for rotation in pillow blocks secured to the side of the housings 101 as indicated at 120. The shafts are rotated oppositely simultaneously by control wheel 121 which rotates such shafts through opposite hand worm gearing transmissions seen at 122 and 123. In this manner, the position of the conveyor belts 36 and 37 can be controlled.

Referring again to FIGS. 1 and 2, it will be seen that the mandrel supports 32 through 34 are spaced further apart than the length of a severed tube section and are actuated by proximity or limit switches as indicated at 125, 126, and 127, respectively. As the leading edge of the severed tubular section passes the switch 127, such switch will be actuated causing the oppositely directed piston-cylinder assemblies of the support 34 to be retracted. This permits the tube to pass between the retracted support pins as seen in FIG. 5. The actuation of the switch 126 will then cause the piston-cylinder assemblies of the unit 34 to extend again gripping the mandrel and at the same time opening the mandrel support 33. Similarly the switch 125 may close the unit 33 while opening the unit 32. An electric eye or sensing device indicated at 128 on the outboard side of the unit 32 functions to close the last unit after the trailing end of the severed product has cleared. It will, of course, be appreciated that more than the three units illustrated may be provided to support the mandrel but that in any event the mandrel will always be supported by at least two such supports.

THE MANDREL

Referring now to FIG. 6 as well as FIG. 5, it will be seen that the mandrel 27 includes elongated tubular member 130 which may be of the square sectional shape indicated in FIG. 5. Secured in such tubular member 130 are mandrel inserts 131 which are exposed top and bottom and which are provided with conical seats seen at 132 which cooperate with the points 133 of the mandrel support pins seen in FIG. 5. There are, of course, three such inserts, one for each mandrel support. For smaller units, the member 130 may be a solid rod.

Referring now to FIG. 6, it will be seen that the tubular member 130 is connected to mandrel extension 134, such extension being threaded on weldment 135 secured to the end of the tubular member 130. A die holder 136 is similarly connected to the extension 134. The interior of the die holder 136 is provided with a squeeze bolt 137, the head 138 of which is shouldered within the die holder. A pair of lock nuts 139 secure on the squeeze bolt head spacer 140 and front and back I.D. dies 141 and 142, respectively. The dies 141 and 142 may move slightly transaxially of the mandrel and during the cut, the internal dies 141 and 142 will follow the external dies as hereinafter described. To limit the offset obtainable between the dies there is provided an annular offset stop insert 143 which is mounted in facing open channels on the interior of the dies. As seen, the exterior surface of the dies are rounded curving away from the interface 144 between such dies. This curvature of the dies may, of course, vary depending upon the configuration desired to be imparted to the end faces of the severed tube. The interface of the internal dies 141 and 142 is maintained by the mandrel supports in vertical alignment with the interface of the external dies, the drive and operation of which will now be described.

EXTERNAL DIE DRIVE, BOTH SIDES DRIVEN

Figure 7:
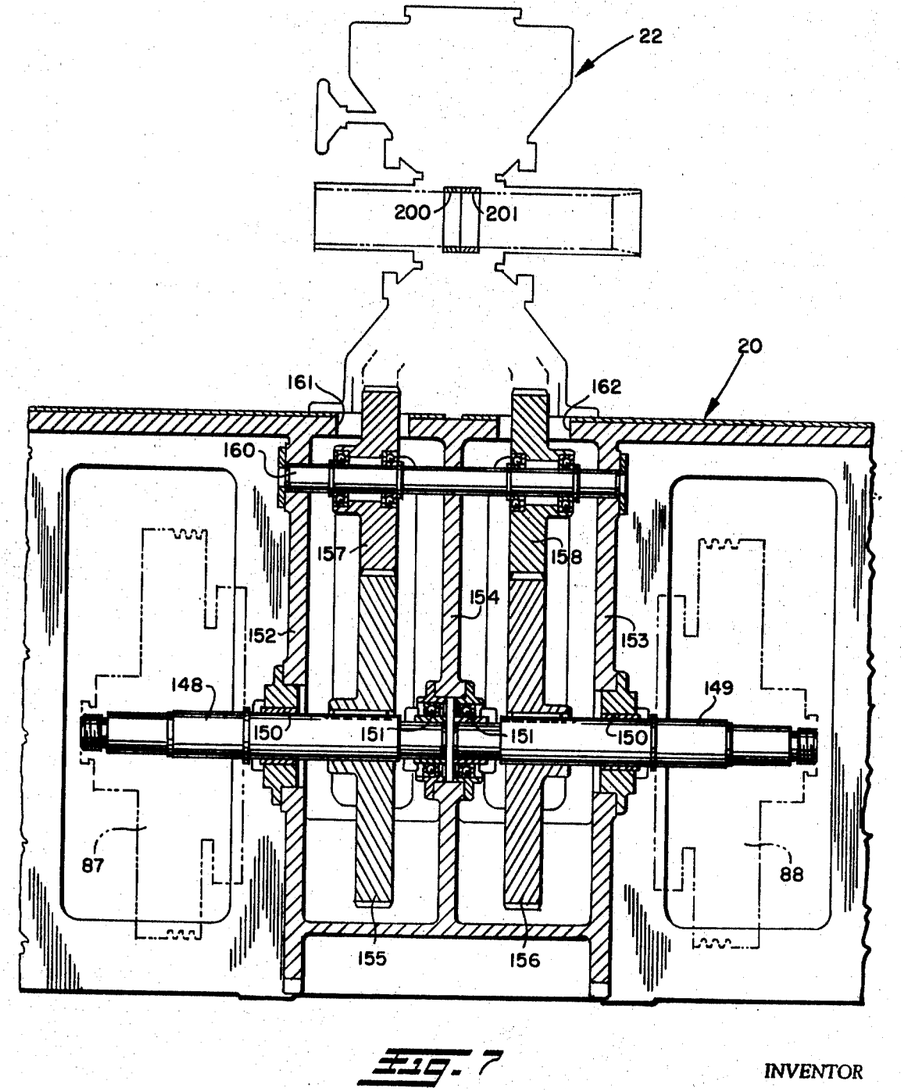
FIG. 7 is an enlarged vertical section of the drive housing for such one embodiment of the present invention taken substantially on the line 7—7 of FIG. 3, the cutting head being shown in phantom lines.
Figure 7A:
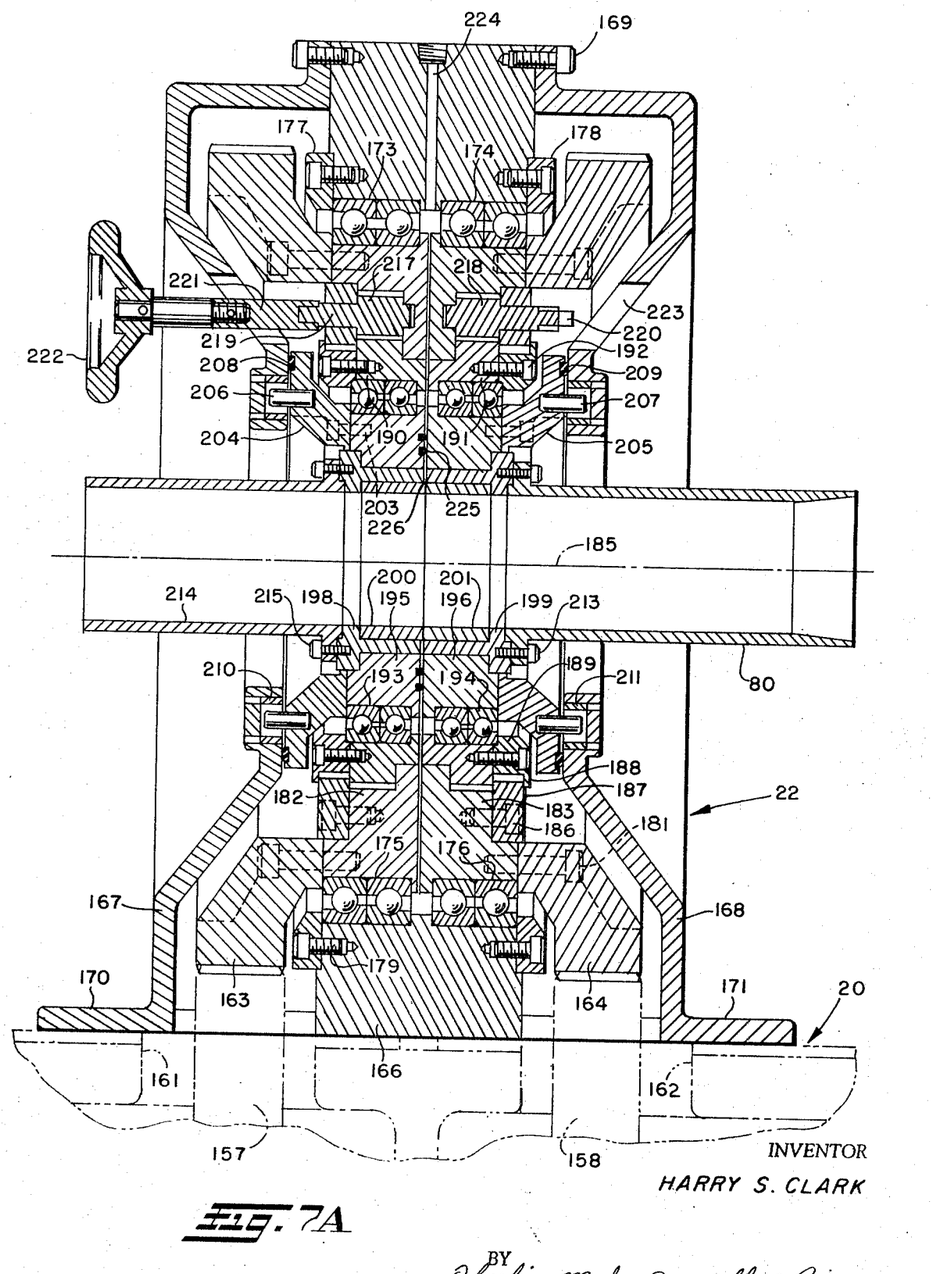
FIG. 7A is an enlarged vertical section taken through such cutting head with the base or drive of FIG. 7 being shown in phantom lines.

Referring now to FIGS. 7 and 7A, it will be seen that the clutch and brake assemblies 87 and 88 driven from the main drive motor 82 are mounted on shafts 148 and 149, each of which is journaled in an outboard bushing 150 and an inboard roller bearing indicated at 151. The bushings 150 are mounted in vertical walls 152 and 153 of the base 20, while the roller bearings 151 are mounted in central wall 154 of such base. Keyed to the respective shafts are large drive gears 155 and 156 which are in mesh with pinions 157 and 158, respectively, such pinions being journaled on idler shaft 160 near the top of the base 20. Such pinions project through openings 161 and 162, respectively, in the top of the base 20 and mesh with the drive gears 163 and 164, respectively, of the cutting head assembly 22 seen more clearly in FIGS. 7A.

Referring now to such FIG. 7A, it will be seen that the cutter head assembly includes an outer housing casting 166 to which are secured oil retainer housings 167 and 168 which are secured to the outer housing casting 166 by fasteners seen at 169. Such oil retainer housings are provided with flanges seen at 170 and 171, respectively, by which the cutter head assembly 22 is secured to the top of the base 20.

The outer housing casting is provided with aligned circular bearing seats 173 and 174 accommodating double row angular contact ball bearings seen at 175 and 176, respectively. Bearing retainer rings 177 and 178 are secured to the sides of the outer housing casting 166 by suitable peripherally spaced fasteners as indicated at 179.

The main drive gears 163 and 164 are secured by suitable fasteners 181 to outer bearing holders 182 and 183 which are journaled in the double row ball bearings 175 and 176. The center of the seats 173 and 174 and thus the ball bearings 175 and 176 is slightly offset or eccentric from the center 185 of the axis of the machine.

Secured to the side of each outer bearing holder by the fasteners indicated at 186 is a marking ring 187 which cooperates with a pointer 188 on bearing retainer 189. Such bearing retainers are mounted on offset adjustment gears 190 and 191 by the fasteners seen at 192. Such offset adjustment gears are journaled on double row angular contact ball bearings 193 and 194 surrounding cutter head sleeve holders 195 and 196. The I.D. of the adjustment gears 190 and 191 and thus the O.D. of the cutter head sleeve holders is also slightly eccentric of the machine or tube axis 185. Secured to the cutter holders 195 and 196, by suitable fasteners not shown, are cutting head holders 198 and 199 in which are secured annular cutting heads 200 and 201. Secured to the holders 195 and 196 by suitable fasteners 203 are bearing and O-ring retainers 204 and 205. Such retainers include axially directed pins 206 and 207 as well as seats for O-rings 208 and 209. The pins 206 and 207 fit within bushings 210 and 211 in the oil retainer housings 167 and 168 and such O-rings 208 and 209 ride against the interior of such housings as indicated. Such pins keep the holders 195 and 196 from rotating.

Infeed tube guide 80 is secured to cutting head holder 199 by the fasteners indicated at 213 while outfeed tube guide 214 is secured to the cutting head holder 198 by the fasteners indicated at 215.

Eccentric or offset adjustment is obtained by adjustment pinions 217 and 218 which are journaled in outer bearing holders 182 and 183. Such adjustment pinions include outwardly projecting studs 219 extending through the adjacent marking rings and which are provided with disconnect heads 220 to which the stud 221 of hand wheel adjusting assembly 222 may be connected. The adjusting assembly fits through windows 223 in the oil retainer housings 167 and 168.

Oil for the main bearings may be admitted through passage 224, there being approximately a 0.030 gap between the outer bearing holders 182 and 183 and the cutter head sleeve holders 195 and 196. The same or similar gap extends between the cutting head holders 198 and 199 as well as the main adjusting gears 190 and 191. A pair of O-rings seen at 225 are provided in the cutter head sleeve holders. The gap between the cutting heads as indicated at 226 is preferably on the order of 0.006 inches. Such gap or interface will be precisely vertically or transaxially aligned with the interface between the mandrel dies seen at 144 in FIG. 6.

TIMING ASSEMBLY

Figure 1:
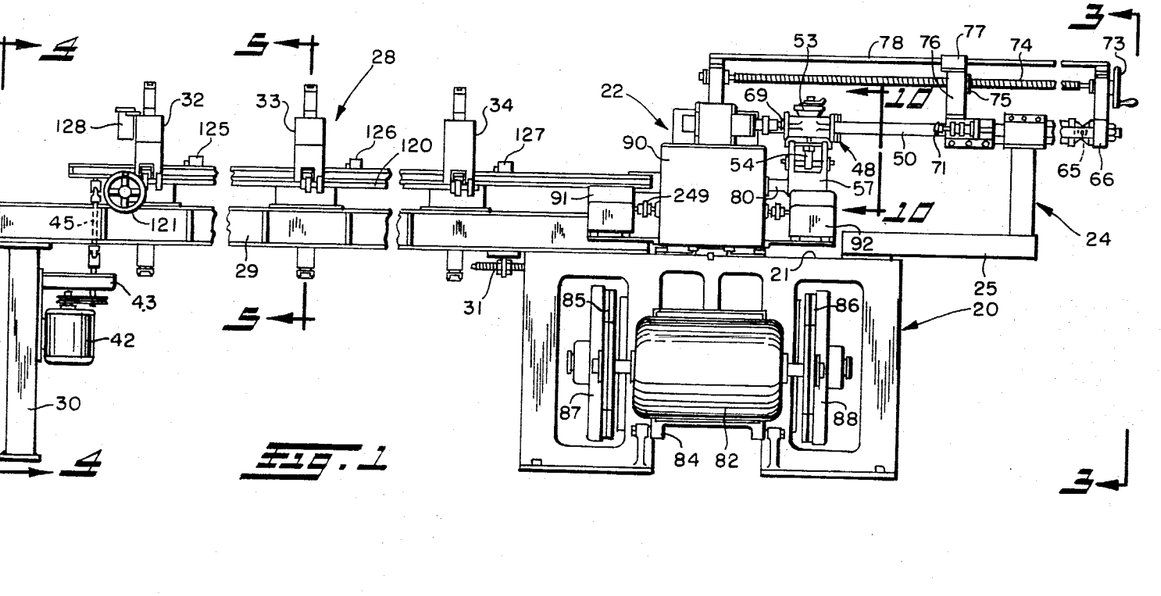
FIG. 1 is a side elevation partially broken away of one embodiment of a machine in accordance with the present invention.
Figure 2:
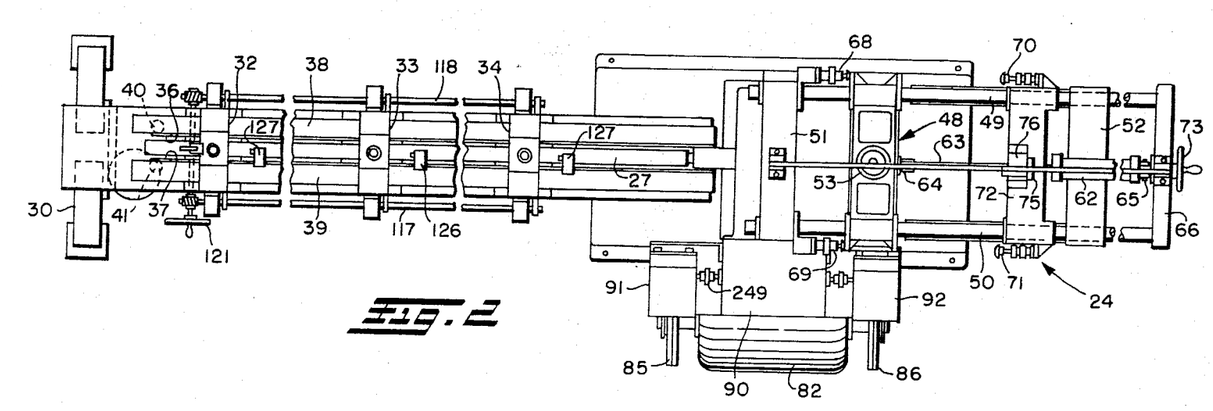
FIG. 2 is a top plan view of such machine corresponding to FIG. 1.
Figure 3:
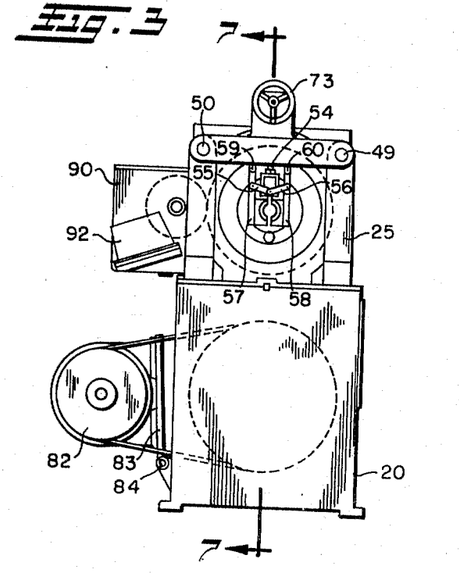
FIG. 3 is an elevation of the freed end of the machine shown in FIG. 1 taken substantially on the line 3—3 of FIG. 1.
Figure 4:
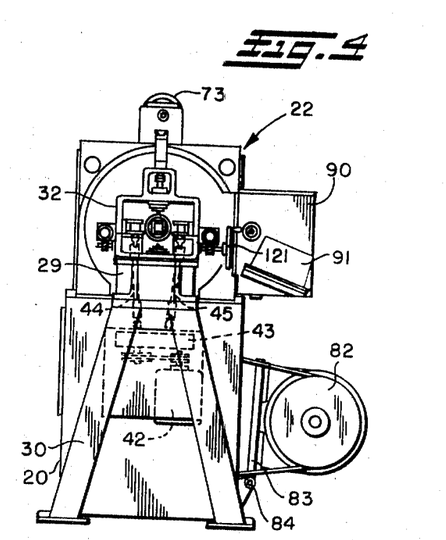
FIG. 4 is an elevation of the discharge end of the machine taken substantially on the line 4—4 of FIG. 1.

The rotary timing switches 91 and 92 seen in FIGS. 1 and 2 are driven from timing gear housing 90 mounted on the side of the cutting head assembly 22. The details of the timing gear housing are seen more clearly in FIGS. 8 and 9. The housing includes a base casting 230 and cover 231, the former having side walls 232 and 233 as well as center upstanding stanchion 234. The casting 230 is secured to the outer housing 166 of the cutter head assembly 22 as well as the oil retainer housings 167 and 168. The latter may be provided with flanges indicated at 235 to facilitate the fastening of the timing gear housing to the side of the cutter head assembly.

As seen more clearly in FIG. 9, mounted within the timing gear housing are two top shafts 237 and 238 each being journaled in the outer wall and the center stanchion. Large gears 239 and 240 are keyed to such shafts, such gears being directly in mesh with the main cutter head drive gears 163 and 164 in the cutter head assembly 22. Timing pinions 241 and 242 are also keyed to the shafts 237 and 238, respectively, such timing pinions being in mesh with further timing gears 243 and 244, respectively, which are keyed to bottom shafts 245 and 246, again respectively. Such bottom shafts are journaled in the outer walls of the housing as well as the inner stanchion as indicated. Each of the shafts is provided with an oil seal at the outer end of the outboard bearing as seen at 247. Drain ports 248 are provided for removal of oil from within the housing.

The shafts 245 and 246 are connected to the timing switches 91 and 92, respectively, by suitable couplings 249 seen more clearly in FIGS. 1 and 2.

It is noted that the shaft 245 is driven at a higher speed than the shaft 246 because of the selected pinions 241 and 243 as opposed to the gears 242 and 244. The speed ratios are related to the amount of phase difference required in the cutter head. The speed of the timing switch shafts can, of course, be varied by a selection of different sets of gears. In any event, a timing switch is driven directly from each of the main gears 163 and 164 of the cutter head assembly through a gear train.

SINGLE SIDE DRIVE EMBODIMENT

Figure 11:
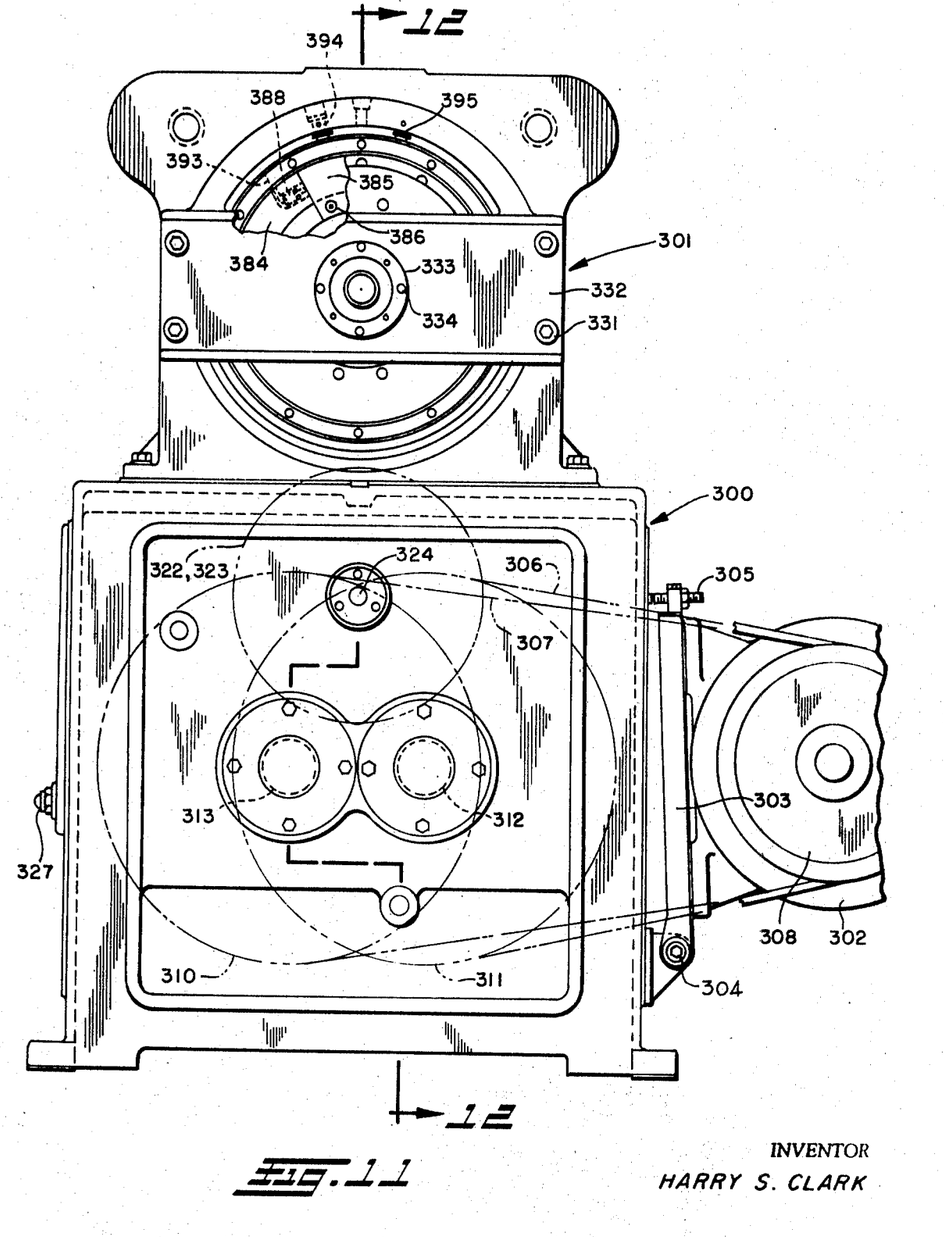
FIG. 11 is an enlarged end elevation of a further preferred embodiment of the present invention utilizing a single side drive.
Figure 12:
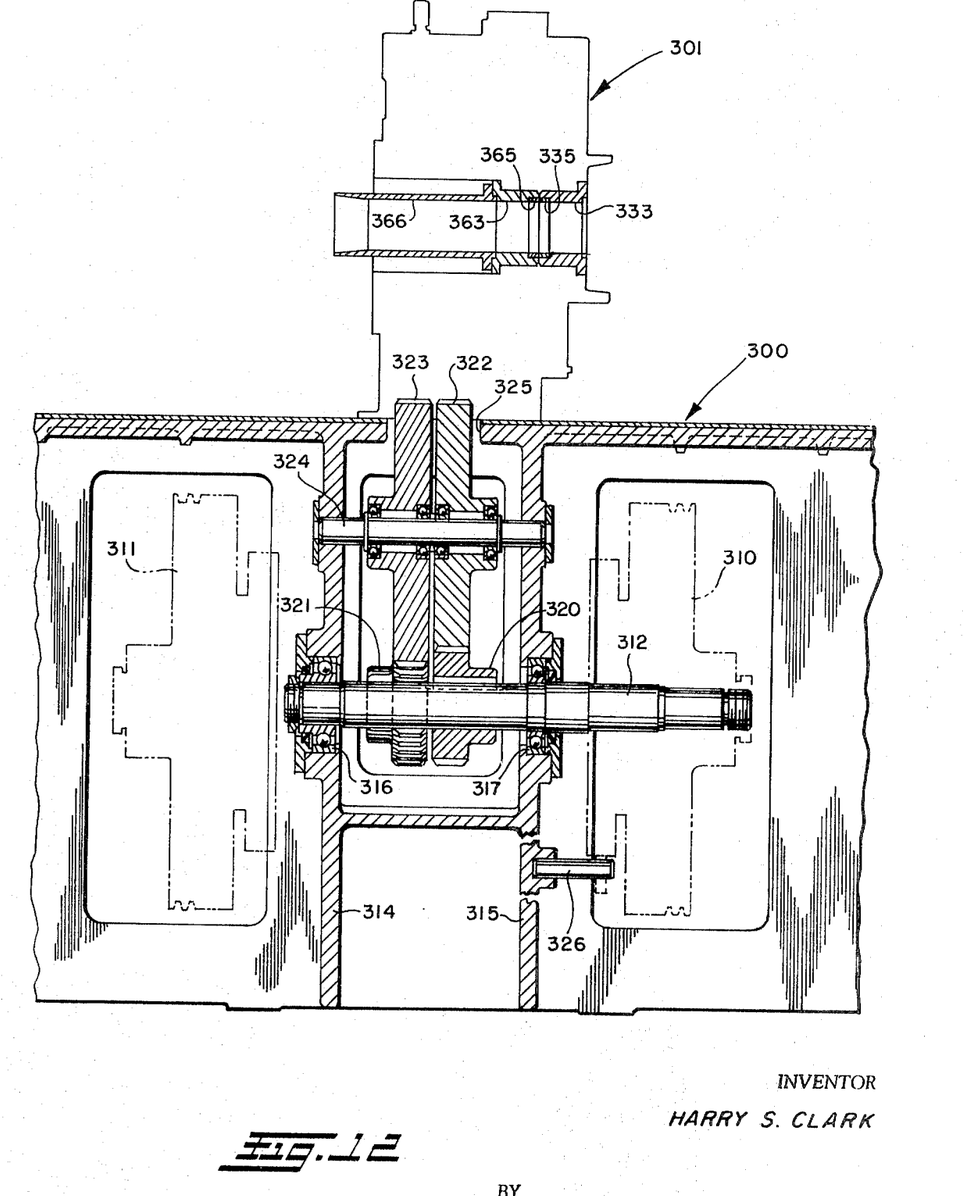
FIG. 12 is a vertical section taken substantially on the line 12—12 of FIG. 11 with the cutter head shown in outline only.
Figure 12A:
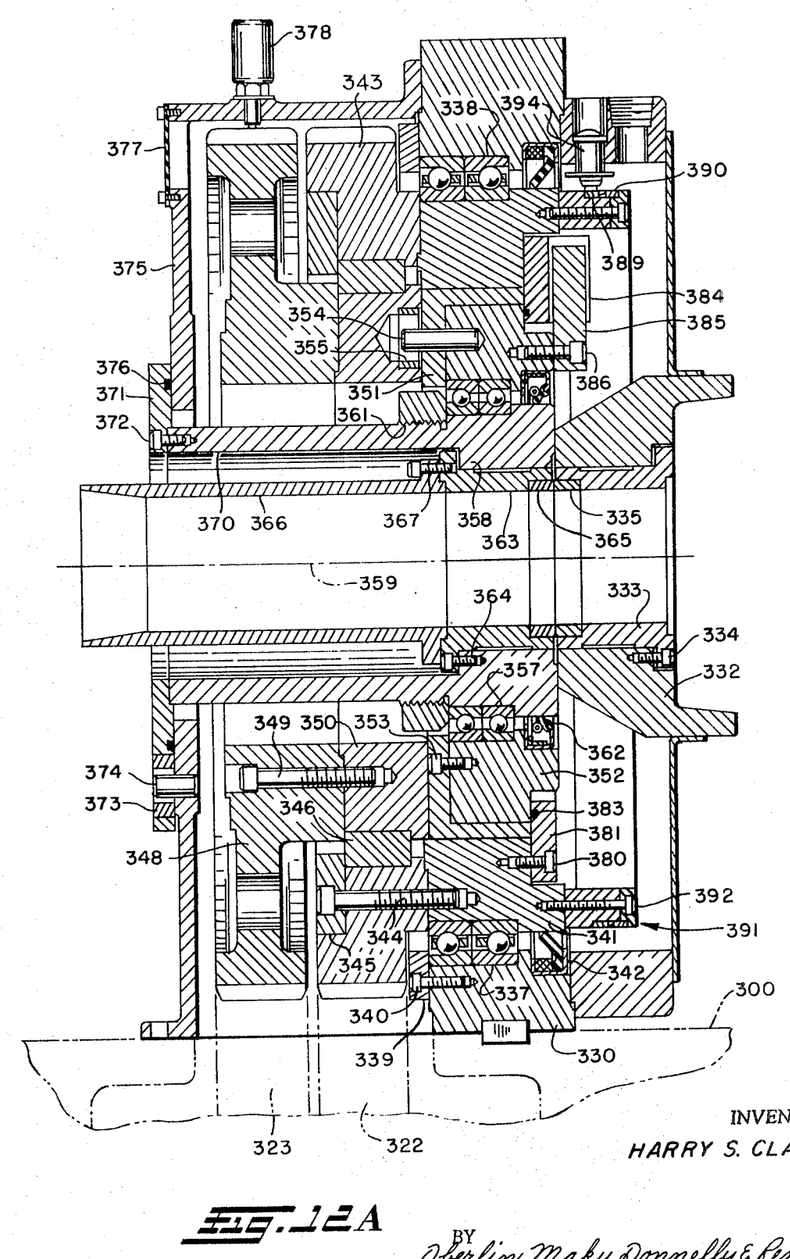
FIG. 12A is an enlarged vertical section of the head shown in FIG. 12.

In the preferred embodiment of the invention illustrated in FIGS. 11, 12, and 12A, only one side of the machine or one of the pair of dies is driven for eccentric movement while the other is held stationary. Referring first to FIGS. 11 and 12, it will be seen that there is provided a base 300 on which the cutter head assembly 301 is mounted. A drive motor 302 is mounted on platform 303 pivoted at 304 to the side of the base and an adjusting bolt assembly 305 is employed to control the tension of drive belts 306 and 307 driven from sheaves 308 at each end of the motor.

The drive belts 306 drive clutch and brake assembly 310 seen in FIG. 12 while the drive belts 307 drive clutch and brake assembly 311. The shafts 312 and 313 on which the clutch and brake assemblies 310 and 311 are mounted, respectively, are journaled in vertical walls 314 and 315 of the base 300 as indicated at 316 and 317, such shafts facing or being cantilevered in opposite directions. Such shafts are horizontally offset as seen in FIG. 11.

A drive gear 320 is keyed to shaft 312 while drive gear 321 is keyed to shaft 313. Such drive gears are in mesh with idle gears 322 and 323, respectively. Brake pins indicated at 326 may be provided for each clutch and brake assembly and a sight gage seen at 327 is provided in the wall of the base opposite the drive motor 302.

Referring now to FIG. 12A, it will be seen that the cutter head assembly 301 includes a main housing 330 secured to the base 300 to the face of which is secured by suitable heavy duty fasteners 331 transversely extending sleeve holder 332 in which is mounted cutter holder 333 by the fasteners indicated at 334. The holder 333 supports annular stationary cutter 335.

The main housing 330 is provided with a circular slightly eccentric bore 337 in which is seated the double row angular contact ball bearings indicated at 338. An annular bearing retainer 339 is secured to the housing by the fasteners 340. Within the bearings 337 there is journaled outer eccentric 341 and a seal seen at 342 is provided between the housing and such outer eccentric. The outer eccentric 341 is secured to inner gear 343 by the elongated fasteners 344. Such fasteners also pass through clamping ring 345 on the outboard side of the gear which hold in place gear bearing, in the form of a large bushing, 346. The gear 343 is in mesh with idle gear 322 in the base 300.

Outer gear 348, which is in mesh with idler gear 323, is connected by elongated fasteners 349 to gear spacer 350 running on the interior of the gear bearing or bushing 346. The gear spacer also runs against thrust bearing 351 which is secured to inner eccentric 352 by the recessed fasteners indicated at 353. A drive pin 354 extends from the inner eccentric 352 through the thrust bearing 351 and into the indicated recess in the gear spacer which is provided with drive insert 355. The inner eccentric 352 is journaled on double row angular contact ball bearings seen at 357 mounted on moving die holder 358. The I.D. of the inner eccentric, like the O.D. of the outer eccentric, is eccentric with respect to the work axis 359.

A lock nut 361 serves as a retainer for the inner ball bearings 357 and an inner seal 362 extends between the inner eccentric and the holder 358. A cutter holder 363 is secured by fasteners 364 to the sleeve 358 and supports therein the moving cutter 365. A tube infeed guide 366 is secured to the moving holder 363 by the fasteners seen at 367.

The sleeve 358 is provided with an axial extension 370 to which is secured plate 371 by the fasteners seen at 372. The plate is provided with a bushing 373 accommodating antirotation pin 374 mounted in gear cover 375. An O-ring seal 376 is provided between the gear cover and the plate 371. An access cover plate 377 and a pulse generator 378 are provided on the gear cover, the latter being used in conjunction with a counter to obtain substantially a 360° cut.

Secured to the face of the outer eccentric 341 by the fasteners seen at 380 is ring 381 which overlaps the face of the thrust bearing 351 as well as the outer edge of the inner eccentric 352. An O-ring seal is provided between such ring and the inner eccentric as seen at 383. Such ring is provided with an axially extending fixed stop seen at 384, i.e., fixed with respect to the outer eccentric 341. Such stop 384 is arcuate in shape and seen perhaps more clearly in the diagrammatic FIGS. 16 through 19. An adjustable stop 385, also arcuate in shape but which may be of somewhat shorter arcuate extent, is secured by fasteners 386 to the inner eccentric 352. The adjustable stop 385 is grounded while the fixed stop 384 is provided with low voltage contact switches such as seen at 388 in FIG. 11 at each arcuate end thereof, each such switch being connected to one of slip rings 389 or 390 mounted on insulated slip ring clamping assembly 391 secured by the fasteners 392 to the outer eccentric 341. The low voltage switch contacts are connected to such rings by the electrical wiring indicated at 393 in FIG. 11. Since the fixed stop is secured like the slip rings to the outer eccentric 341, the fixed stop and slip rings will move together. A pair of brushes seen at 394 and 395 ride against such rings to receive signals therefrom.

The adjustable stop is adjustable in the sense that it can be replaced by a stop of a different size, i.e., different arcuate extent thus to control the amount of offset of the oscillating or moving die 365. This is perhaps better illustrated in connection with the schematic illustrations of FIGS. 16 through 19 hereinafter described in connection with the operation.

THE OUTFEED EMBODIMENT, FIGS. 13 AND 14

Figure 13:
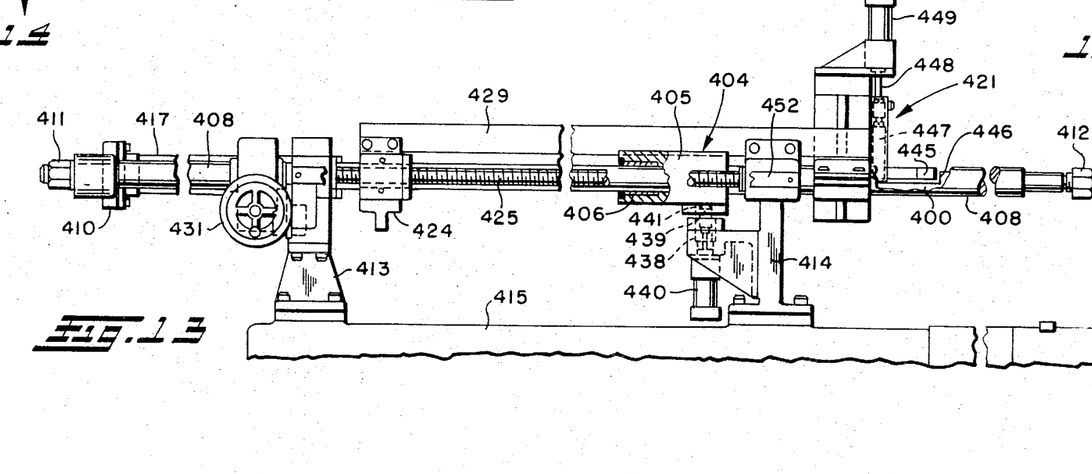
FIG. 13 is a fragmentary side elevation partially broken away and in section illustrating certain details of a modified outfeed mechanism.
Figure 14:
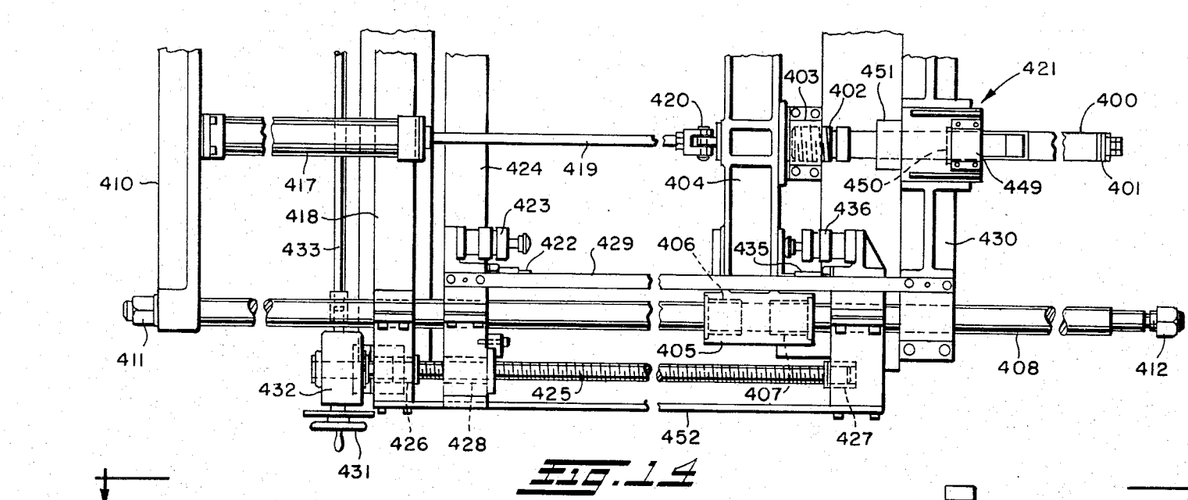
FIG. 14 is a fragmentary top plan view partially broken away of the outfeed mechanism seen in FIG. 13.

In the outfeed embodiment illustrated in FIGS. 13 and 14, the mandrel 400 having the internal dies 401 thereon is reciprocated to and from the operative tube severing position with respect to the outer dies. When the mandrel has been retracted, the severed tube is pulled with the mandrel a sufficient distance to clear the outer dies and is then stripped from the mandrel to drop into a bin or conveyor below.

The mandrel 400 at its proximal end is provided with a threaded stud 402 secured in mandrel holder 403 in turn secured to the front of carriage frame 404. The frame 404 is in many respects similar to the reciprocating frame 48 of the infeed as seen more clearly in FIG. 10 and extends horizontally with each end being provided with hub 405 having bushings 406 and 407 therein slidingly supporting the carriage on laterally spaced guide rods 408. It is noted that only one such guide rod is illustrated but it is believed apparent that the other would be symmetrically positioned with respect to the mandrel 400.

Such guide rods are interconnected at their outer ends by frame 410 which is clamped thereto by nuts 411. Similar clamping nuts 412 at the opposite ends of the guide rods may be employed to secure such guide rods to the cutting head assembly. Such guide rods are supported on stanchions 413 and 414 which are in turn secured to the top of frame 415.

A piston-cylinder assembly 417 is secured at its blind end to the transverse frame 410 and at its rod end to transverse frame 418 supported by the stanchions 413. The rod 419 of such piston-cylinder assembly is connected at 420 to the mandrel reciprocating carriage 404. In this manner, the retraction of the piston-cylinder assembly 417 will pull the mandrel 400 back through mandrel support and stop assembly shown generally at 421 to the extent permitted by positive stops 422 associated with shock absorbers 423. The retraction stops and shock absorbers 422 and 423 are mounted on movable transverse frame 424, such movement being obtained by screws 425 on each side of the outfeed unit, such screws being journaled at 426 and 427 for rotation. Such screws are threadedly connected to retained nuts in the transverse frame 424 as indicated at 428.

The movable transverse stop frame 424 is connected by tie bars 429 to the transverse frame 430 supporting the mandrel support and stop assembly 421. The stop assembly 421 is thus movable with the stop frame 424 and such movement may be obtained by hand wheel 431 which simultaneously rotates both screws 425 through transmission 432, the opposite screw being rotated through connecting shaft 433. The extension limit of the mandrel is controlled by adjustable stops 435 associated with shock absorbers 436. Such positioning stops and shock absorbers are mounted in a fixed position supported by the stanchions 414 as are shot pin assemblies 438 which include shot pins 439 operated by piston-cylinder assemblies 440. When the mandrel is in its forward position as dictated by the stops 435, the shot pins are extended into seats 441 on the carriage 404 locking the carriage and thus the mandrel in proper position. In such position, the interface of the internal dies 401 will be aligned with the interface of the external dies. The mandrel may be adjusted through its connection with the carriage as seen at 402 and 403.

The mandrel support and stop assembly 421 includes a positive stop 445 on which may be mounted, for example, a low voltage contact switch sensing the end of the tube to be cut thereagainst. When in operative position, the stop 445 fits within a slot or recess seen at 446 in the mandrel 400. The stop 445 is mounted on a vertically extending plate which is in turn mounted on gibs seen at 447. The plate is connected to the rod 448 of piston-cylinder assembly 449, which when retracted will pull the stop 445 out of the recess and clear of the path of a tube surrounding the mandrel. The assembly 421 includes a stripping ring 450 closely surrounding the mandrel as well as a mandrel aligner or bushing 451.

The outfeed assembly of FIGS. 13 and 14 may be used either with the dual side drive cutting head of FIG. 7A or the single side drive cutting head of FIG. 12A. As an infeed for such outfeed assembly, there may be employed, for example, a squeeze roll assembly wherein pressure rolls may be employed to drive the tube to be severed into the cutting head. With the mandrel in position and locked, and with the stop 445 in position, the infeed device would drive the tube to be severed through the cutting head and over the mandrel 400 until the end of the tube contacts the stop 445. This would shut off the feed and start the cut cycle. The adjustment wheel 431 positions the stop 445 to obtain the desired length of tube, scale 452 being used for this purpose.

After the severing cycle is completed, the stop 445 is withdrawn by retraction of the piston-cylinder assembly 449 and the shot pins 439 are also retracted. Now the piston-cylinder assembly 417 is retracted to withdraw the mandrel from the cutting head and the mandrel pulls with it the severed tube section to clear the external dies. The severed tube section is then engaged by the stripping ring 450 and stripped from the mandrel as the mandrel continues its retraction. The severed tube then simply drops into a bin or take-away conveyor. The mandrel is then extended. The shot pins lock the same in place and the tube stop 445 is repositioned for the next cycle.

OPERATION

The operation of the infeed and the two outfeed embodiments of the present invention are believed apparent from the foregoing. However, referring now to FIG. 15, for the dual side drive embodiment of FIG. 7A, and FIGS. 16 through 19 of the single side drive embodiment of FIG. 12A, the operation of such embodiments will be described as follows.

Figure 15:
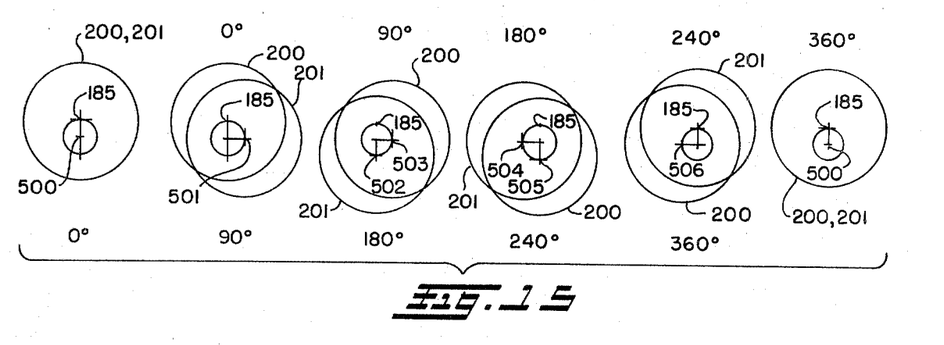
FIG. 15 is a series of schematic illustrations showing, somewhat exaggerated, the relative movement of the cutting dies of the FIG. 7A embodiment during a cycle of operation.

Referring first to FIG. 15, it will be seen that the cutters are represented by the circles 200 and 201 which in the initial or cycle start position are concentric about the center or tube axis 185. To start the cut cycle, one of the clutches 87 or 88 will be energized to move eccentrically one of the cutters with respect to the tube axis 185 and, of course, with respect to the other cutter. For example, the clutch 88 may be energized to cause the main drive gear 164 seen in FIG. 7A to rotate 90° so that the cutter 201 is now positioned as seen in the second schematic illustration. The center of the cutter 201 has now moved about the eccentric axis of the cutters seen at 500 to the position 501 which is eccentric of the tube axis 185. At this 90° position, the clutch 87 is now energized driving the gear 163 at the same speed as the gear 164 but 90° behind phase.

With the gear 164 continuing to rotate, the center of the cutter 201 now moves to the position 502 which is its position of maximum eccentricity with respect to the tube axis 185. At the 180° mark for the cutter 201, the cutter 200 has moved 90° with its center being at 503. At 240° for the cutter 201, its center moves to the position 504 while the cutter 200, at 180°, follows with its center at the position 505. At the 360° position for the cutter 201, its center returns to the tube axis center 185 while the cutter 200 continues to the 240° mark with its center at the position 506. The brake of the clutch and brake unit 88 is now energized holding the cutter 200 at its centered concentric position while the clutch 87 continues engaged bringing the cutter 200 back onto the concentric position centered about the tube axis as seen in the final schematic illustration of FIG. 15. At this point, the severing of the tube is completed. It will, of course, be appreciated that the internal dies have moved with the external dies to obtain the shearing action. It will also be appreciated that the eccentricity shown schematically in FIG. 15 is greatly exaggerated for purposes of illustration.

It will be seen that the tube cutters orbit about their eccentric axis 500, the extent of eccentricity of which can be varied by the adjustment 222 seen in FIG. 7A such orbiting moving the cutters from the position concentric with the tube axis to an offset position, the maximum extent of which is obtained at the 180° position for each cutter. The shearing action of the tube is obtained by the offset between the cutters which results from the starting of the cutter 200 90° behind the cutter 201. This offset can, of course, be controlled by the timing switches so that one cutter may move at any desired phase lag behind the other. However, one complete orbital movement of each cutter about the cutter eccentric axis 500 is sufficient to sever the tube.

Figure 16:
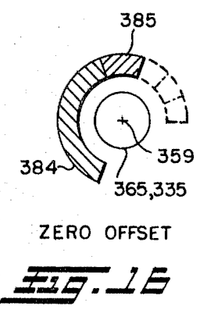
FIGS. 16 through 19 are a series of schematic illustrations illustrating the operation of the stop system for the single side drive embodiment of FIG. 12A which controls the amount of die offset.
Figure 17:
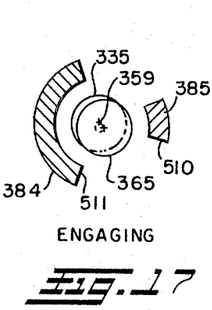
Figure 18:
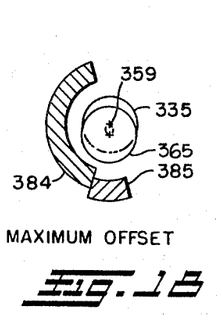

For the single side drive, reference may be had to FIGS. 16 through 19. The cycle may start at the zero offset position and with both clutches 311 and 310 engaged, both stops 384 and 385 will be engaged with the stops abutting and in such position the cutting die 365 will not move from its concentric position. Die 335 is, of course, stationary. The outer eccentric of the stop 384 will be stationary with respect to the inner eccentric of the stop 385, even though both are rotating with respect to the machine frame. To obtain the cut, the clutch 311 driving the eccentric of stop 385 remains engaged while the clutch 310 driving the stop 384 is released and braked. Now the stop 385 moves away from the end of the stop 384 as shown in FIG. 17 and the moving die 365 begins to orbit about the eccentric axis and becomes offset with respect to the fixed die 335. The stop face 510 of the adjustable stop 385 moves into engagement with the stop face 511 of the fixed stop 384 as seen in FIG. 18. During the movement from the position shown in FIG. 16 to the position shown in FIG. 18, the offset between the dies increases from zero to maximum. When the stop faces 510 and 511 engage maximum offset is obtained and the switch in the stop face 511 now operates and clutch 310 re-engages for 360° rotation at such maximum offset. Such 360° rotation is ensured by pulse generator 378 and its associated counter which begins counting pulses from pulse generator 378 when the switch in face 511 is operated. This effects severing of the tube.

Figure 19:
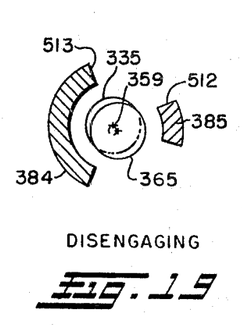

To disengage the cutters as seen in FIG. 19, the clutch 310 driving the stop 384 remains engaged while the clutch 311 driving the stop 385 is released and the brake thereof is engaged so that the stop 385 catches up to the stop 384 and when the stop surfaces 512 and 513 engage actuating the switch 388, zero offset is obtained and the cut cycle is complete.

As seen in FIG. 16 the extent of the offset may be controlled by replacing the adjustable stop 385 with stops indicated by the phantom lines 514 of different arcuate extent.

In the FIG. 7A embodiment, the machine is normally stopped, i.e., the brakes on and clutches off, while in the FIG. 12A embodiment the machine is normally running all the time with the clutches on and brakes off. In such FIG. 12A embodiment, when the one gear is braked, the resistance encountered will determine the time period before the stops come together as in FIG. 15. This achieves the bite into the tube at the selected depth or offset. It may take several revolutions to obtain full depth depending on the hardness of the tube and wall thickness. After full depth or offset is obtained, one complete 360° revolution severs the tube. The machine of FIG. 12A, for example, may have a total offset of one-fourth in. This would be obtained when the adjustable stop 185 moves 180°. If its movement is limited to 30°, for example, one-sixth of the total offset would be obtained.

The mandrel stop 143 limits the internal dies so they cannot move apart more than one-half the wall thickness of the tube, although with a square or other sectional shape, more than one-half the wall thickness may be necessary. Normally, the cut is obtained by shearing less than one-half the wall thickness from the outside while simultaneously shearing less than one-half the wall thickness from the inside allowing the center then to fracture. This substantially eliminates burrs or other irregularities. The stops or die settings obtain the extent of external penetration and such penetration may vary depending upon the hardness of the material. The dies in any event condition the tube edge during the cut.

By controlling the penetration and using dies of proper configuration, cold working of the tube ends may be obtained during the cutting action. For example, long chamfers may be produced on both the O.D. and I.D.

It can now be seen that there is provided a tube cut-off which will rapidly sever (50–90 cuts per minute) tubular workpieces providing a high quality finish to the ends thereof in the process. The apparatus can readily be adjusted to accommodate tubes of different wall thickness. In any event, a tube shear is provided wherein the tubular workpieces have a superior finish avoiding the requirement of subsequent finishing operations.

I, therefore, particularly point out and distinctly claim as my invention:

1. A cut-off for tubes and the like comprising a pair of annular dies surrounding such tube, means operative to move one of said dies eccentrically of the other a predetermined distance, and means to orbit said one die while maintaining such eccentricity to sever such tube.

2. A cut-off as set forth in claim 1 wherein said one die is orbited at least 360° about an axis eccentric to the tube axis.

3. A cut-off as set forth in claim 2 wherein the other of said dies is orbited 360° about the same axis as said one of said dies but behind phase to maintain such eccentricity between said dies.

4. A cut-off as set forth in claim 1 including means operative to adjust the eccentricity of said dies with respect to the tube axis to sever tubes of different wall thickness.

5. A cut-off as set forth in claim 4 wherein said means operative to adjust the eccentricity of said dies with respect to said tube axis comprises a double eccentric for each die, and means operative to rotate one eccentric with respect to the other.

6. A cut-off as set forth in claim 5 wherein said means operative to rotate one eccentric with respect to the other to adjust such eccentricity comprises gearing operative to rotate one eccentric with respect to the other.

7. A cut-off as set forth in claim 1 wherein said dies are each held against rotation but are journaled within eccentric drive means rotating thereabout.

8. A cut-off as set forth in claim 7 wherein said eccentric drive means comprises an eccentric rotating on an eccentric axis, and means to rotate said eccentric to change the degree of eccentricity of the die.

9. A cut-off as set forth in claim 8 wherein said eccentric comprises a gear having an eccentric bore therein and mounted in a housing journaled for rotation on an eccentric axis.

10. A cut-off as set forth in claim 9 including pinion means operative to rotate said gear within said housing.

11. A cut-off as set forth in claim 1 including a clutch and brake drive for each of said annular dies, and timing switch means operative to energize said clutch and brake drives to determine such eccentricity between such dies.

12. A cut-off as set forth in claim 1 wherein the other of said dies is stationary.

13. A cut-off as set forth in claim 1 wherein said one die is driven for such orbital movement by a pair of eccentrics, and stop means on said eccentrics controlling the eccentricity between said dies.

14. A cut-off as set forth in claim 13 including clutch and brake drives for each eccentric, and switch means on said stop means operative to control said clutch and brake drives.

15. A cut-off as set forth in claim 1 including means operative to adjust such eccentricity of said dies to sever tubes of different wall thickness.

16. A cut-off as set forth in claim 15 wherein said means operative to adjust the eccentricity comprises a double eccentric for said one die, and means operative to rotate one eccentric with respect to the other.

17. A cut-off as set forth in claim 16 wherein said means operative to adjust the eccentricity comprises stops on each eccentric, the position of one stop with respect to the other controlling such eccentricity.

18. A cut-off as set forth in claim 17 including clutch and brake drives for each eccentric, and switch means on said stop means operative to control said clutch and brake drives.

19. A cut-off as set forth in claim 1 including a mandrel, a pair of annular dies on said mandrel corresponding to said annular dies surrounding such tube, and means limiting transaxial movement of said dies on said mandrel.

20. A cut-off for tubes and the like comprising juxtaposed annular dies surrounding such tube, drive means operative to offset one from the other, and means to orbit said one while maintaining such offset.

21. A cut-off as set forth in claim 23 wherein said other die is stationary.

22. A cut-off as set forth in claim 24 including double eccentric drive means for said one die, and stop means on said eccentrics operative to control such offset.

23. A cut-off as set forth in claim 25 including clutch and brake drive means for each eccentric, and switch means on said stop means operative to control said clutch and brake drive means.

24. A cut-off as set forth in claim 26 wherein said cut-off is normally running with both clutches engaged and the brakes released, one clutch being disengaged and the brake set to obtain such offset.

25. A cut-off as set forth in claim 27 wherein said one die is orbited at least 360° to obtain the severing action with both clutches engaged and such brakes released.

26. A cut-off as set forth in claim 28 wherein the other clutch is released and its brake engaged to return said offset to zero following such severing action.

27. A cut-off as set forth in claim 20 wherein said one die is held against rotation and is orbited about the axis of said stationary die.

28. A tube cut-off for tubes and the like comprising a pair of concentric dies surrounding such tube, and means operative to move both of said dies eccentrically but out of phase to sever such tube.

29. A cut-off as set forth in claim 28 including means operative to adjust the eccentricity of said dies to sever tubes of different wall thickness.

30. A cut-off as set forth in claim 29 wherein said means operative to adjust the eccentricity comprises a double eccentric for each die, and means operative to rotate one eccentric with respect to the other.

31. A cut-off as set forth in claim 28 wherein said dies are held against rotation but are journaled within eccentric drive means rotating thereabout.

32. A cut-off as set forth in claim 31 wherein said eccentric drive means comprises an eccentric rotating on an eccentric axis, and means to rotate said eccentric to change the degree of eccentricity of the die.

33. A cut-off as set forth in claim 32 wherein said eccentric comprises a gear having an eccentric bore therein and mounted in a housing journaled for rotation on an eccentric axis.

34. A cut-off as set forth in claim 33 including pinion means operative to rotate said gear within said housing.

35. A cut-off as set forth in claim 28 wherein such movement out of phase is obtained by moving such dies at the same speed but for different periods.

36. A cut-off as set forth in claim 35 wherein one die is moved only after the other die is moved through an orbit of about 90°.

37. A cut-off as set forth in claim 36 including clutch and brake drive means for each die to obtain such out of phase movement.

38. A cut-off as set forth in claim 29 including a mandrel supporting a pair of internal dies corresponding to said pair of concentric dies and aligned therewith, and means to permit but limit relative movement between said internal dies.

39. A method of severing tubular objects comprising the steps of placing a tubular workpiece in a pair of annular juxtaposed dies, offsetting one die from the other, and orbiting such one die while maintaining such offset to effect a severing of such tubular workpiece.

40. A method as set forth in claim 39 including the step of utilizing a double eccentric for at least one of said dies to obtain the desired degree of offset for severing tubes of different wall thickness.

41. A method as set forth in claim 40 including the step of utilizing stops on each eccentric to obtain the desired degree of offset.

42. The method of claim 40 including the step of utilizing gearing between each eccentric to obtain the desired degree of offset.

43. A method as set forth in claim 39 wherein said dies are held against rotation.

44. A method as set forth in claim 39 wherein one die is orbited out of phase of the other to obtain such severing action.

45. A method as set forth in claim 39 including the step of utilizing a pair of internal dies aligned with said annular juxtaposed dies, and limiting relative movement between said internal dies to avoid movement of such dies more than half the wall thickness of the tube.

* * * * *